Figure 5:
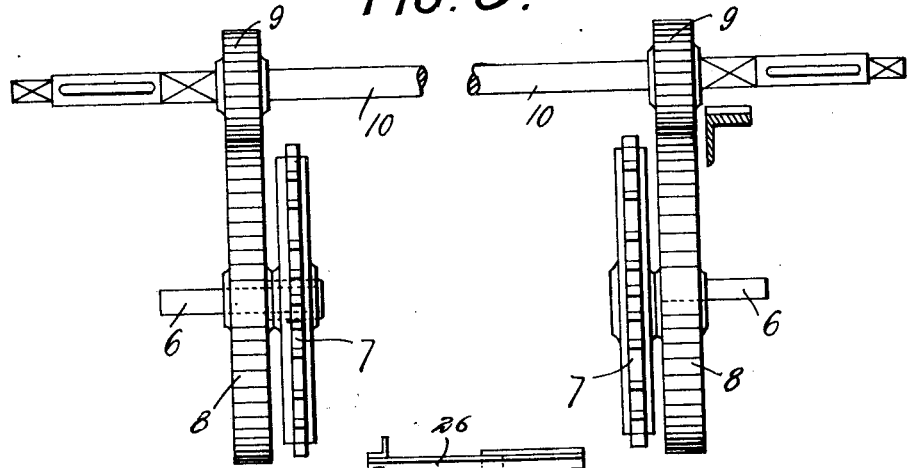

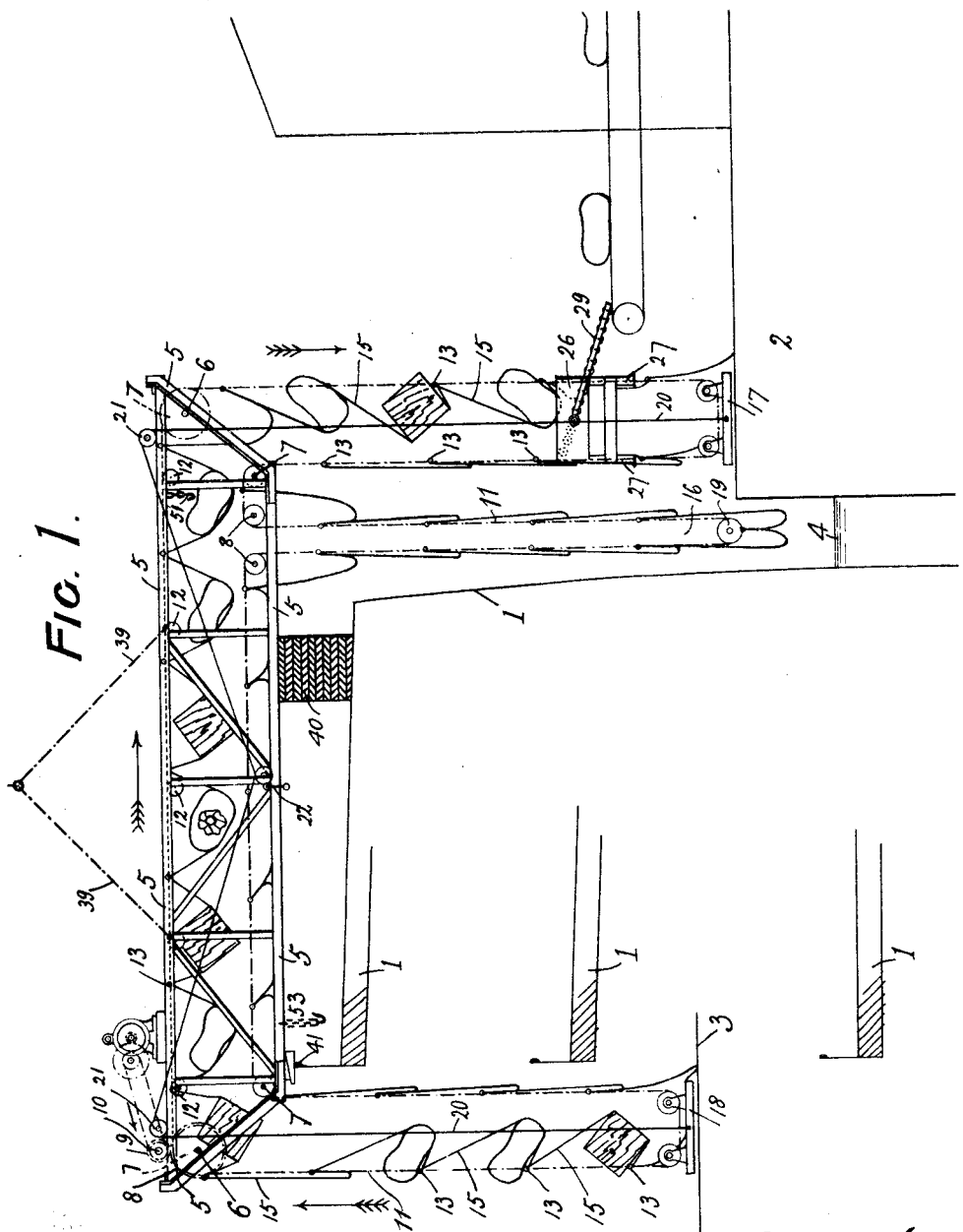

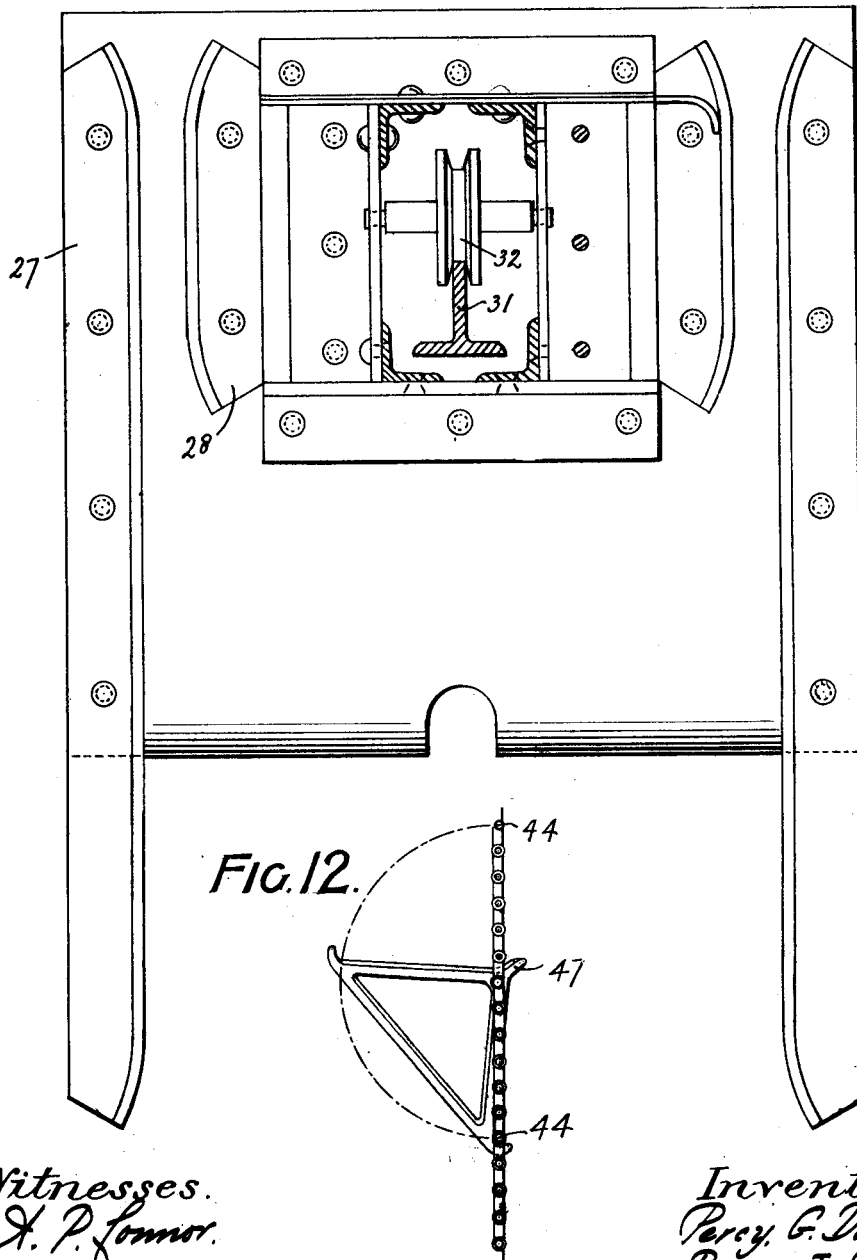

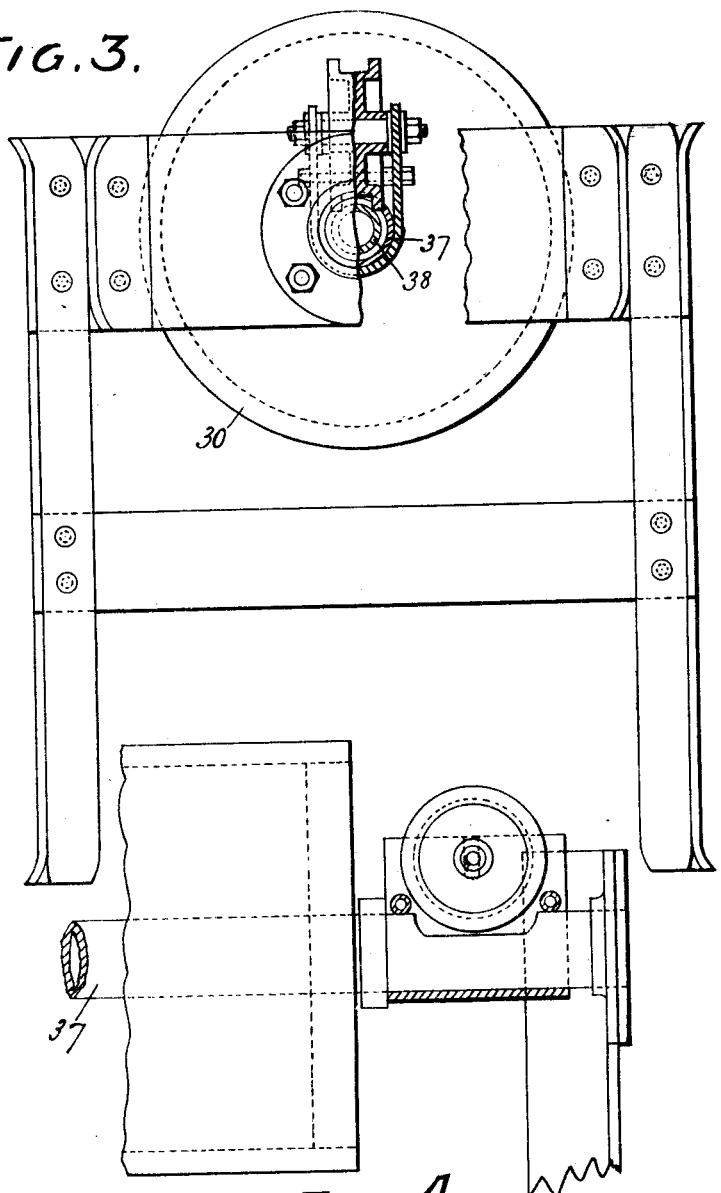

P. G. & B. I. DONALD.
CONVEYER.
APPLICATION FILED JAN. 23, 1911.

1,112,440.

Patented Oct. 6, 1914.
6 SHEETS—SHEET 5.

Witnesses.
H. P. Connor.
H C Hunsberger

Inventors.
Percy G. Donald.
Bruce I. Donald.
B. Singer
Atty.

P. G. & B. I. DONALD.
CONVEYER.
APPLICATION FILED JAN. 23, 1911.

1,112,440.

Patented Oct. 6, 1914.
6 SHEETS—SHEET 6.

Witnesses.
J. P. Connor.
H. C. Hunsberger.

Inventors
Percy G. Donald.
Bruce I. Donald.
B. Singer
Atty.

UNITED STATES PATENT OFFICE.

PERCY GEIKIE DONALD AND BRUCE ISAAC DONALD, OF LONDON, ENGLAND.

CONVEYER.

1,112,440.   Specification of Letters Patent.   Patented Oct. 6, 1914.

Application filed January 23, 1911. Serial No. 604,137.

*To all whom it may concern:*

Be it known that we, PERCY GEIKIE DONALD and BRUCE ISAAC DONALD, subjects of the King of Great Britain, and residents of London, England, (whose post-office address is 225 Upper Thames street, London, England,) have invented Improvements in Conveyers, of which the following is a specification.

Our invention relates to improvements in conveyers of the endless chain type, and more particularly to those intended for use in loading and unloading the cargoes of ships or such like vessels, whether they be at sea or at the quay side or any other places.

The principal object of the invention is to provide a conveyer which shall be altogether handier, less unwieldy, and more portable and easily managed than those hitherto known, and which, moreover, will automatically adjust itself against any list or variation of level or distance of the ship in relation to the place from and to which the material or goods have to be conveyed.

With these ends in view, the improvements comprise, firstly, a pair of parallel endless chains, belts or ropes, with carriers arranged transversely between them, and having two hanging legs or loops; secondly, a beam or girder for carrying all the conveying mechanism and adapted to contain the whole of the conveying tackle when not in use, such girder being conveniently lifted into and out of position by sling chains and a derrick; thirdly, means for retaining the chains to facilitate the stowing of the conveying tackle within the girder or to enable additional lengths of chain to be added if desired; fourthly, a discharge frame for guiding the chains on the delivery side and for carrying a plate or roller or other form of stop, such frame being either suspended from the girder or connected with the quay or other place of delivery; fifthly, adjustably suspended weights, which may be termed anchor weights, holding down the two hanging legs or loops of the endless chains; sixthly, a compensation bight in the endless chains and a weight in the same to automatically take up the slack in the chains, and allow for the rise and fall of the vessel and tide.

In addition to the foregoing, there are certain improvements in details as well as in the construction and arrangement of the apparatus as a whole, which will appear from the following description.

The conveying tackle comprises two endless parallel chains or the like which run upon idle rollers situated at intervals along each side of the girder, one of the legs of the tackle being adapted to hang down in the hold of the vessel and the other leg against the wall of the quay or the side of the lighter or other place at which the loading or unloading (as the case may be) is done. The individual carriers are suspended upon cross-bars which span across the two chains at regular intervals, being fastened into the links of such chains after the fashion of chain pins so as not to interfere with the passing of the chains over the sprockets, and the cargo is carried upward by one leg of the conveyer and downward by the other leg, until it is discharged automatically as further explained herein.

We will now proceed to describe our invention with reference to the accompanying illustrative drawings, in which:—

Figure 13:
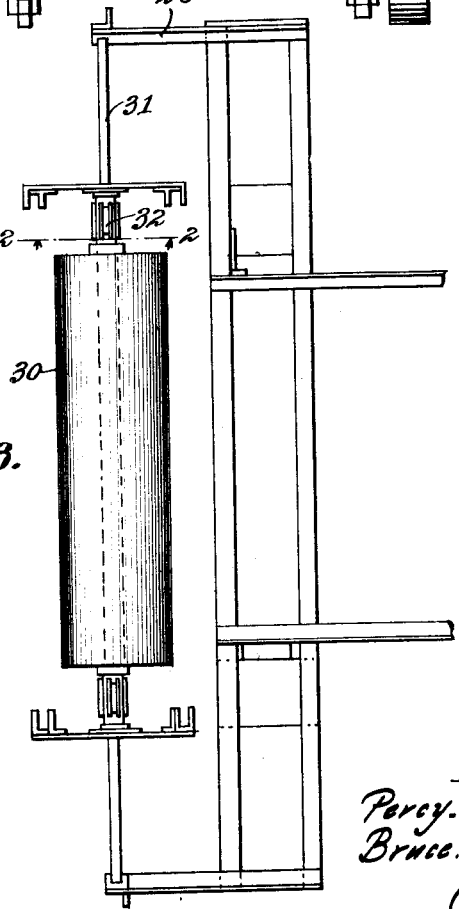
Figure 7:
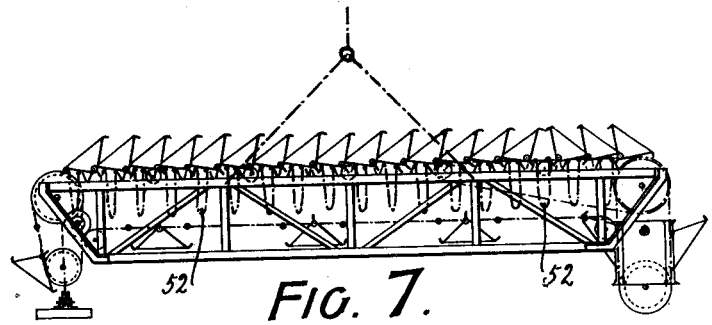
Figure 6:
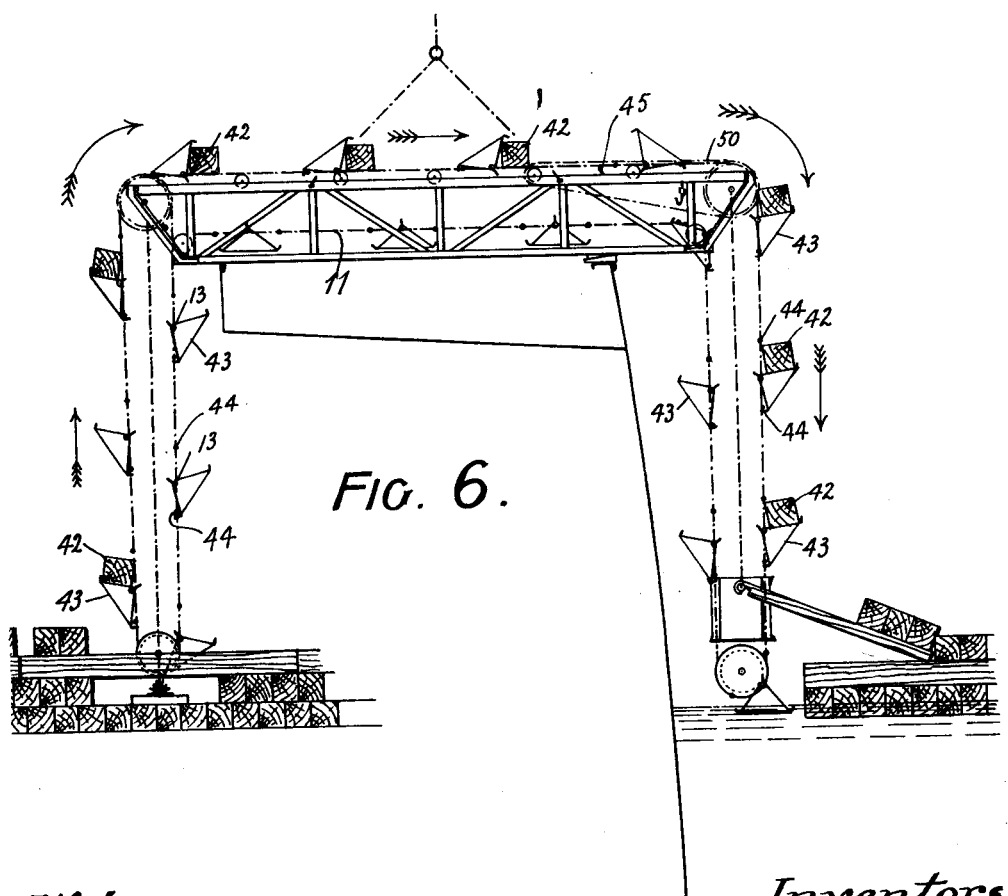
Figure 8:
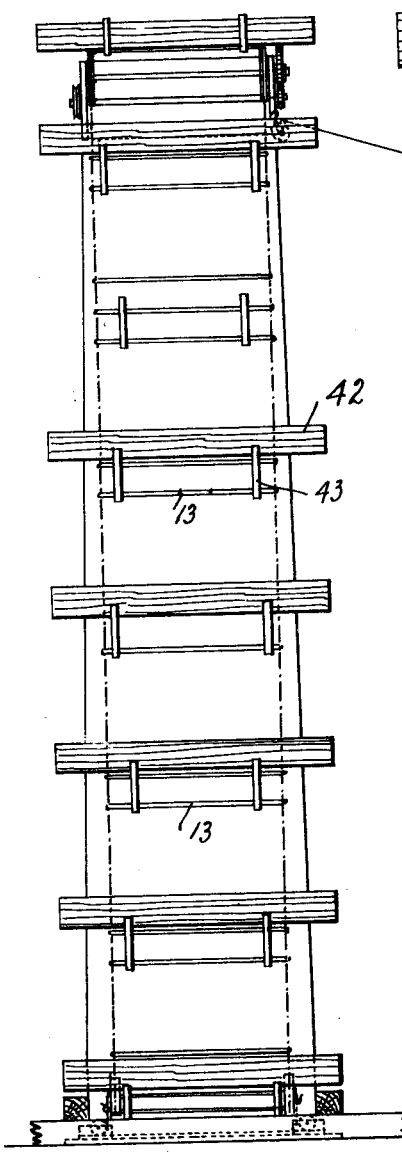
Figure 9:
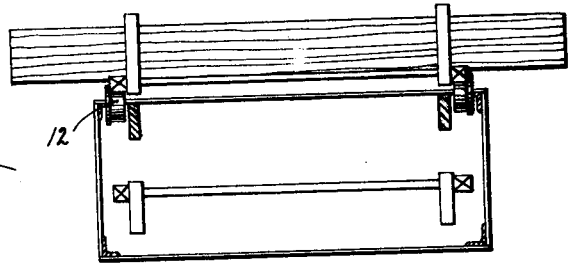
Figure 10:
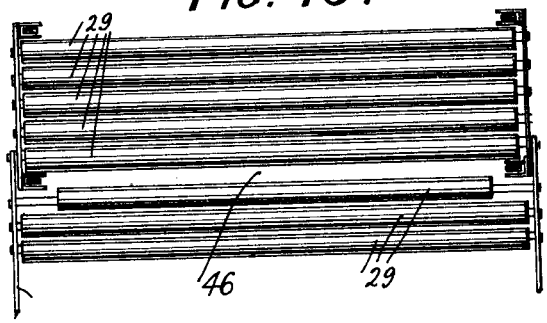
Figure 11:
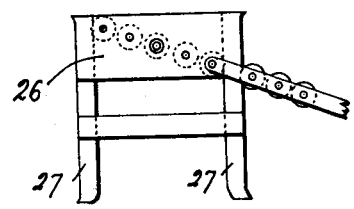

Figure 1 is a diagrammatic side elevation of one form of the entire conveyer shown in position unloading the cargo of a ship alongside the quay; a portion of the ship and quay being also represented. Fig. 2 is a side elevation, partly in section, of one form of discharge frame on line 2—2 of Fig. 13 looking in the direction of the arrows. Fig. 3 is a side elevation, partly in section, of another form of discharge frame. Fig. 4 is a front elevation of one end of the discharge frame shown in Fig. 3. Fig. 5 is a detail view of the driving gear bearings and shafts. Fig. 6 is a view similar to Fig. 1, illustrative of a conveyer adapted for transporting railway sleepers and the like. Fig. 7 is a side elevation of the conveyer shown in Fig. 6, as it appears when the conveying tackle is stowed away. Fig. 8 is an end elevation on a relatively larger scale, of the inner leg of the conveyer shown in Fig. 6. Fig. 9 is a transverse section through the girder. Fig. 10 is a plan of the discharge frame combined with a roller type of discharge platform. Fig. 11 is a side elevation of Fig. 10. Fig. 12 is a detail side view of one of the brackets which serve as carriers when dealing with railway sleepers and the like. Fig. 13 is a plan view of a discharge frame with a single discharge roller.

The same reference numerals denote the same or corresponding parts throughout the several views.

Referring to Fig. 1, the parts marked 1 denote the ship being unloaded, and 2 is the quay. The line 3 indicates the level to which the cargo has been already unloaded, and 4 indicates the level of the water. The conveyer comprises a beam or box girder 5 adapted to support and contain the whole of the conveying tackle and driving gear. This girder, which may be composed of angle irons braced together as shown, carries a pair of chain wheels or sprockets 7, 7 and spur wheels 8, 8 keyed thereto, the latter being engaged by a pair of spur pinions 9, 9 mounted on a common driven shaft 10, which is shown most clearly in Fig. 5.

Endless chains 11 ride over said sprockets and are driven thereby. Rollers 12 are provided at intervals along the top member of the girder for sustaining the top flight of the chains in a horizontal position. These could be dispensed with, however, as we take advantage of the usual cross-bars 13 to keep said chains raised by causing the ends of said bars 13 to rest or slide along upon longitudinal rails 14 upon either side within the top of the girder. Pockets or slings 15, made preferably of sailcloth or the like, are suspended from every pair of these bars, so that the mouths of same are open upward. The carrier composed of the chains and slings, as described, hangs down in the form of a loop or leg from each end of the girder, when in position for use. The turning point at the bottom of each leg is kept down by weights 17, 18 or hooks (preferably adjustable weights), against which the carrier constantly exerts an upward pull, owing to a bight 16 being formed in the lower flight of the carrier, and furnished with a balance weight 19 carried upon an axle which has a flanged roller at each extremity by which it is suspended in the endless chains. The weights 17, 18, which are each two or three times as heavy as the weight 19, are supported upon ropes 20, 20, so as to hang within the hold and over the quay respectively. Nevertheless, the weights 17, 18 could be made to rest upon any other kind of support, though the ropes mentioned are most convenient, because they can be adjusted as regards height by means of pulleys 21 over which they pass, and a winch 22 or other means can conveniently be used for winding them up or unwinding them.

When the carrier is working, the slings 15, as they begin their ascent through the hold, become distended by the articles which are fed into them by hand or machinery, and consequently they bulge both inward and downward. After turning the corner of the girder 5 they assume a trough shape, which is again changed to a form very similar to the original when descending upon the overside leg to the quay 2. Here the slings are emptied either by hand or turned inside out automatically, and they are carried back in an empty condition to the hold of the vessel, where they are again charged with cargo. Instead, however, of their traveling empty over half their course, they might be charged with cargo from the quay for the ship, and this could be emptied by a device located on the ship and similar to that used on the quay.

The discharge means consists of a suspended rectangular frame 26, having angle irons 27, 28, disposed vertically along each of its four corners, to serve as guides for the chains. Transversely within this frame is situated a stop, which may be in the form of a series of rollers 29 constituting a roller-platform, there being a central axle pin projecting from each side of the frame to which the suspension ropes are secured. When the discharge frame 26 is not suspended, it is useful to provide a single discharge roller 30, having a certain amount of side play. This is attained by means of a T-iron cross-rail 31 (somewhat longer than the roller) mounted between the sides of the discharge frame 26. The roller 30 is provided with runners 32 at its ends, which travel along the T-rail 31 if the discharge frame 26 is swung sidewise by the fore and aft movement of the vessel, or for other reasons. In place of a T-rail, a tubular rail 38 (Figs. 3 and 4) may be used, which is surrounded by a hollow spindle 37 which carries the roller 30. Said rail 38 is supported at its ends upon brackets or other supports upon the quay. The roller platform, as shown clearly in Figs. 10 and 11, is arranged with a gap 46 through which the slings, or any other convenient carriers, may pass, ejecting the contents on to the platform or on a chute. The girder 5 may be lifted into and out of position by a derrick with sling chains 39, and when in proper position, the girder rests at one end upon the bulwarks or upon hatches 40, and at the other end upon the top framing 41 of the hold.

The conveyer shown in Fig. 6 is of substantially the same construction. By way of illustration, however, the endless chain is not provided with a special loop or bight, while the carriers themselves are not in the form of receptacles, but they act as supports to special kinds of cargo, such as railway sleepers 42 which extend beyond the chains on each side. In this form the carriers resemble triangular brackets, 43, swiveled upon the cross-bars 13, other cross-bars, 44, being provided to support those corners of the brackets which for the time being are lowermost. As will be seen, it is necessary for these carriers 43 to be tilted over before descending by the overside leg, so as to carry the sleepers 42 upon their other side. For this purpose each bracket (or each carrier) is provided with a tail-piece 47 (Fig. 12) which comes in contact with a fixed stop 45 situated on the top member of the girder 5. Before the carrier is tilted over, it is necessary for the sleeper 42 to be carried forward at a greater speed than the conveyer, the effect of which is to transfer the sleeper from the carrier which has supported it to the next carrier in front, which latter conveys it to the point of discharge. This transference is effected by means of an accelerator comprising a pair of short endless chains 50 forming a small horizontal conveyer raised slightly above the level of the main conveyer and driven by chain and sprocket gear at a higher speed, as mentioned.

For stowing the conveyer shown in Fig. 1, a chain retainer, such as a hook 51, is secured into the conveyer chain 11 upon each side of the girder 5, near to the forward end. One of the weights 17 or 18, is fastened down and the main driving gear will first draw up the bight, and then the leg of the conveyer, which is not held down. The slack of the endless chain, together with the carriers and crossbars, (i. e. the whole of the conveying tackle) is gathered together along the top member of the girder 5, the chain forming a series of loops 52, as shown in Fig. 7, which figure also shows the sleeper carriers gathered together along the girder. Before drawing up the remaining leg. it may be advisable to secure the chain to the girder by another retaining device or hook 55, upon the bottom member of the girder. The weight holding down this leg may now be disconnected and the leg left free to rise until the whole gear is stowed away compactly within and around the girder, whereupon the driving gear is brought to rest, and the whole apparatus may be removed.

In the form illustrated in Figs. 6 and 7, the bight is dispensed with, and therefore the overside leg of the conveyer is made of such a length as to hang a sufficient distance below the discharge frame to allow for variations in level. This arrangement can be stowed in a manner similar to the foregoing. For the purpose or rigging for use, the order of stowing is reversed.

We claim—

1. In a loading and unloading apparatus. the combination with a frame, of upper and lower carrier wheels on said frame, an endless carrier trained over said wheels and having depending working end loops and a depending idler loop, a weight carried by the idler loop, and a weight for each working end loop, each of said last named weights being greatly in excess of the idler loop weight, substantially as described.

2. In a loading and unloading apparatus, the combination with a carrier support, an endless carrier adapted to be advanced on said support and having pendent looped ends adjacent the loading and unloading points, pockets each composed of a flexible strip of material having its ends connected with the carrier at points spaced apart a distance less than the length of the strip, whereby the resulting slack of the strip causes the pockets to always open upwardly, and means for collapsing said pockets to discharge the contents thereof.

3. In a loading and unloading apparatus, the combination with a carrier support, an endless carrier adapted to be advanced on said support and having pendent looped ends adjacent the loading and unloading points, pockets each composed of a flexible strip of material having its ends connected with the carrier at points spaced apart a distance less than the length of the strip whereby the resulting slack of the strip causes the pockets to always open upwardly when traveling vertically up or down or in a horizontal position, and rolling mechanism for collapsing said pockets to discharge the contents thereof at the unloading point, substantially as described.

In testimony whereof we affix our signatures in presence of two witnesses.

PERCY GEIKIE DONALD.
BRUCE ISAAC DONALD.

Witnesses:
ARTHUR H. STANLEY,
R. WILSON.